(12) United States Patent
Bert

(10) Patent No.: US 11,966,638 B2
(45) Date of Patent: Apr. 23, 2024

(54) DYNAMIC RAIN FOR ZONED STORAGE SYSTEMS

(71) Applicant: Micron Technology, Inc., Boise, ID (US)

(72) Inventor: Luca Bert, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 27 days.

(21) Appl. No.: 17/720,136

(22) Filed: Apr. 13, 2022

(65) Prior Publication Data

US 2023/0333783 A1     Oct. 19, 2023

(51) Int. Cl.
*G06F 3/00*     (2006.01)
*G06F 3/06*     (2006.01)
*G06F 11/10*     (2006.01)

(52) U.S. Cl.
CPC .......... *G06F 3/0689* (2013.01); *G06F 3/0604* (2013.01); *G06F 3/0655* (2013.01); *G06F 11/1032* (2013.01); *G06F 11/1076* (2013.01); *G06F 11/108* (2013.01)

(58) Field of Classification Search
CPC .... G06F 11/108; G06F 11/1032; G06F 11/10; G06F 3/0689; G06F 11/1076
See application file for complete search history.

(56) References Cited

U.S. PATENT DOCUMENTS 11,340,987 B1\* 5/2022 Gole ..................... G06F 3/0619
2023/0161500 A1\* 5/2023 Doucette ............. G06F 12/0238
711/5

\* cited by examiner

*Primary Examiner* — Reginald G Bragdon
*Assistant Examiner* — Michael L Westbrook
(74) *Attorney, Agent, or Firm* — Schwegman Lundberg & Woessner, P.A.

(57) ABSTRACT

Aspects of the present disclosure configure a system component, such as memory sub-system controller, to dynamically generate Redundant Array of Independent Nodes (RAIN) parity information for zone-based memory allocations. The RAIN parity information is generated for a given zone or set of zones on the basis of whether the given zone or set of zones satisfy a zone completeness criterion. The zone completeness criterion can represent a specified size such that when a given zone reaches the specified size, the parity information for that zone is generated.

20 Claims, 8 Drawing Sheets

US 11,966,638 B2

DYNAMIC RAIN FOR ZONED STORAGE SYSTEMS

TECHNICAL FIELD

Embodiments of the disclosure relate generally to memory sub-systems and more specifically, to error-correction parity calculations in a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
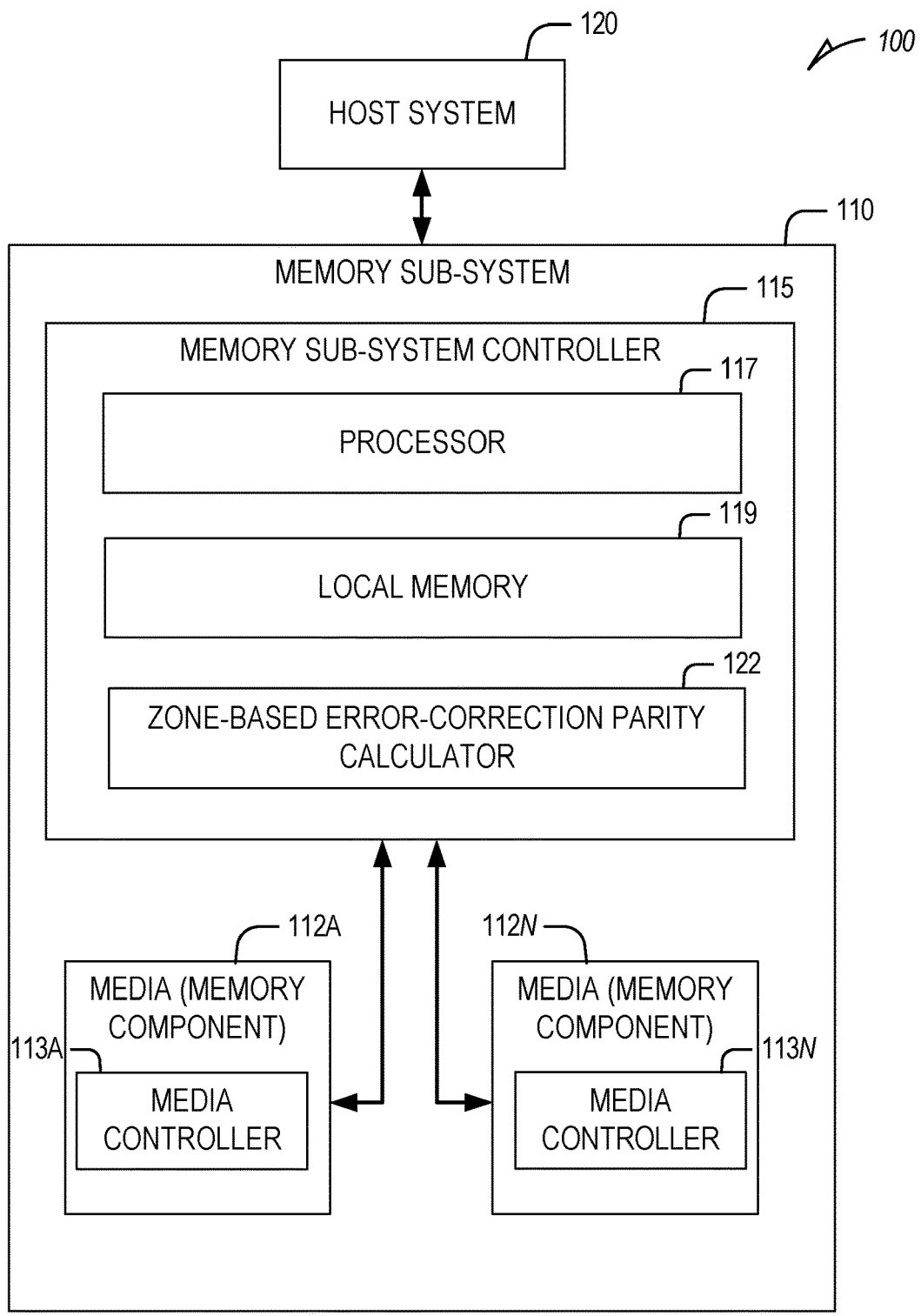
FIG. 1 is a block diagram illustrating an example computing environment including a memory sub-system, in accordance with some embodiments of the present disclosure.

Aspects of the present disclosure configure a system component, such as a memory sub-system controller, to dynamically generate error-correction parity data, such as Redundant Array of Independent Nodes (RAIN), also known as Redundant Array of Independent Disks (RAID), parity data for zone-based memory allocations. The parity data is generated for a given zone or set of zones on the basis of whether the given zone or set of zones satisfy a zone completeness criterion. The zone completeness criterion can represent a specified size and/or specified time interval such that when a given zone reaches the specified size and/or when the specified time interval elapses, the parity data for that zone is generated.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can send access requests (e.g., write command, read command) to the memory sub-system, such as to store data at the memory sub-system and to read data from the memory sub-system. The data specified by the host is hereinafter referred to as "host data" or "user data". The data can be stored in the memory sub-system according to zones. Namely, various zones can be defined in the memory sub-system each of which can be uniquely associated with a particular set of user data or an application. For example, a first zone can be associated with a first application (or user data identified as received from the first application) and a second zone can be associated with a second application. Host data or user data received from the first application can be stored by the memory sub-system in the first zone. The zones can be of equal or unequal size and can span the size of a single block on a die, multiple blocks on the die, an entire die or a set of dies of the memory sub-system. In some examples, the memory sub-system includes a Zoned Name Space (ZNS) SSD memory sub-system.

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., ECC codeword, parity code), data version (e.g., used to distinguish age of data written), valid bitmap (which LBAs or logical transfer units contain valid data), etc.

The memory sub-system can initiate media management operations, such as a write operation, on host data that is stored on a memory device. For example, firmware of the memory sub-system can move zones or data within zones to perform wear level, read disturb operations and/or other similar functions.

"User data" can include host data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

A memory device can be a non-volatile memory device. A non-volatile memory device is a package of one or more dice. Each die can comprise one or more planes. For some types of non-volatile memory devices (e.g., NAND devices), each plane comprises a set of physical blocks. For some memory devices, blocks are the smallest area than can be erased. Each block comprises a set of pages. Each page comprises a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package. The memory device can be divided into one or more zones where each zone is associated with a different set of host data or user data or application.

Conventional memory sub-systems can employ error-correction techniques, such as using a redundant array of independent NAND-type flash memory devices (hereafter, referred to as a RAIN technique), to protect data (e.g., host or user data) stored on the memory sub-systems. Error-correction techniques can comprise calculating parity (e.g., XOR parity) across some collection of data (e.g., host/user data) being error-protected. By such error-correction techniques, if a data member of the collection is lost (e.g., corrupted) for any reason, the parity calculation can be reperformed and the lost data recreated. As error-correction techniques, such as RAIN techniques, get more complex, so can the number of parallel parity calculations performed to achieve the error-correction protection and the memory resources needed to perform the parallel parity calculations. For example, when the set of memory components comprise multi-plane NAND devices, such as triple-level cell (TLC) NAND devices, multiple (e.g., dozens of) parity calculations may need to be performed in parallel to implement data protection (e.g., for host/user data) stored on the memory sub-system. Data in such conventional memory sub-systems is usually written sequentially across multiple dice of the NAND memory devices. When the data is completely written across a given row of blocks of a specified set of dice of the memory devices, the RAIN parity calculation is performed and stored in a parity block associated with the given row.

While such approaches for generating the RAIN parity generally work well for conventional memory devices, these approaches cannot be applied to zones (ZNS, zoned name space) (or zone-based) memory systems. This is because rather than writing the data across sequential blocks of the memory device until the specified number of blocks is written to for generating the RAIN parity, the data is written to specific zones of the memory device. Each zone can span a respective set of blocks in a corresponding die or set of dice rather than sequentially across a row of blocks. As a result, the point at which an entire row is completely written to is unknown. For example, a particular application can be associated with a zone that spans a single die. User or host data associated with that application can be stored in that zone on the single die. According to conventional approaches, the RAIN parity is generated when an entire row associated with multiple zones across a specified set of dice is written to, which may never end up happening. This results in RAIN parity not being generated and data being lost.

Aspects of the present disclosure address the above and other deficiencies by configuring a system component, such as a memory sub-system controller of a memory sub-system, to generate parity data, such as RAIN parity, for a particular zone or set of zones when a zone completeness criterion or criteria is/are met. In particular, a memory sub-system controller of some embodiments described herein can perform a parity calculation for an error-correction technique (referred to herein as an error-correction parity calculation) when a given zone associated with the memory sub-system satisfies a zone completeness criterion or condition. For instance, some embodiments cause a memory sub-system to compute the RAIN parity for a given zone when a size of the zone reaches a specified threshold, such as when a size of data written to the zone reaches a maximum zone size or a specified fraction of the zone size (e.g., 25%, 50% or 75% of the maximum zone size). As another example, some embodiments cause a memory sub-system to compute the RAIN parity for a given zone when an elapsed time since data was last written to a given block of the given zone reaches a specified threshold. For some embodiments, the memory sub-system comprises a set of NAND memory components, and the error-correction parity calculation can be associated with a RAIN technique used (by the memory sub-system) to achieve error-correction protection of data (e.g., host/user data) stored on the set of NAND memory components.

By generating the parity data for a given zone when a zone completeness criterion is met, various embodiments can avoid risking data loss as a result of waiting until an entire row spanning multiple dice and zones is written to. Various embodiments described herein would be configured (e.g., via a data count threshold value and a time period) to leave data unprotected for only a small window of time (when a zone completeness criterion is not met) before performance of an error-correction parity calculation.

For some embodiments, a memory sub-system (e.g., memory sub-system controller) receives host or user data from a host system and writes the host/user data to a zone that includes a set of blocks (e.g., open blocks) on a set of memory components of the memory sub-system. As the host/user data is written to the set of blocks, the memory sub-system can defer a set of error-correction protection operations for the set of blocks to a time when a zone of the memory sub-system satisfies the zone completeness criterion. For some embodiments, the set of error-correction protection operations comprises performing a set of error-correction parity calculations and writing (e.g., storing) results thereof on the memory sub-system. Depending on the embodiment, the results of the set of error-correction parity calculations can be written in-line with the host/user data on the set of memory components, or can be written to dedicated (e.g., reserved) memory of the memory sub-system, such as dedicated parity blocks of the set of memory components that are separate from blocks used to store data (e.g., host/user data) being protected.

Performing the error-correction parity calculations can include reading memory pages from a zone that satisfies the zone completeness criterion. The memory pages are copied and stored as initial parity data in a temporary storage location, such as DRAM. Data written to a second zone can be determined to meet the zone completeness criterion. In such cases, the data from the second zone is combined with the initial parity data stored in the DRAM, such as by performing a logical XOR operation between the data currently stored in the DRAM and the data stored in the second zone. Metadata is associated with the parity data stored in the DRAM that identifies the zones for which the parity data has been generated. The metadata can include a set of pointers that specify the starting and ending block addresses of each zone represented by the parity data stored in the DRAM. When the number of zones represented by the parity data stored in the DRAM reaches a specified quantity (e.g., four zones), the parity data is moved from the DRAM to a permanent storage location on the memory sub-system. Specifically, the set of results of the error-correction parity calculations can be copied from the DRAM (temporary storage location) to a permanent location on the memory sub-system, such as to dedicated memory (e.g., dedicated parity block of the set of memory components) of the memory sub-system.

As noted herein, for some embodiments, the set of memory components (of the memory sub-system) comprises a set of dedicated blocks for storing error-correction parity calculation data (e.g., results) that error-correction protects data (e.g., host/user data) stored on the set of memory components, where the set of dedicated blocks is separate from the set of blocks on the memory components that store the protected data. In this way, some embodiments can reduce or avoid the performance penalty that sequential reads experienced when the error-correction parity calculation data is stored in-line with the data that it is protecting (no need to skip the error-correction parity calculation data during a sequential read since it is stored in the dedicated blocks separate from the blocks storing the protected data).

For some embodiments described herein, the set of memory components comprises a plurality of NAND devices for storing user data, and the memory sub-system controller implements a redundant array of independent NAND devices (RAIN) technique with respect to the plurality of NAND devices, which can provide error-correction protection for host/user data stored on the plurality of NAND devices. For example, the RAIN protection scheme used can comprise a parity scheme having a stripe length (e.g., 7 data bits) that describes how many host/user data elements (e.g., host/user data bits) form a single stripe of host/user data (stored on the plurality of NAND devices) that is associated and protected by a single parity element (e.g., single parity bit). A given single parity element associated with and protecting a given stripe of host/user data can be calculated using an XOR parity calculation. Where the plurality of NAND devices comprises multi-plane NAND devices, such as TLC NAND devices, each zone can participate in a separate XOR parity calculation, thereby providing multi-zone failure detection and enabling the memory sub-system controller to independently rebuild each zone using parity data.

Though various embodiments are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. In some embodiments, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative- and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. In some examples, the memory cells of the memory components 112A to 112N can be grouped into a set of different zones of equal or unequal size used to store data for corresponding applications. In such cases, each application can store data in an associated zone of the set of different zones.

The memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. The memory sub-system controller 115 can be responsible for other operations such as wear leveling operations, read disturb operations, error detection and error-correcting code (ECC) operations, encryption operations, caching operations, address translations between a logical block address and a physical block address that are associated with the memory components 112A to 112N, address translations between an application identifier received from the host system 120 and a corresponding zone of a set of zones of the memory components 112A to 112N. This can be used to restrict applications to reading and writing data only to/from a corresponding zone of the set of zones that is associated with the respective applications. In such cases, even though there may be free space elsewhere on the memory components 112A to 112N, a given application can only read/write data to/from the associated zone, such as by erasing data stored in the zone and writing new data to the zone. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115.

The memory sub-system 110 includes a zone-based error-correction parity calculator 122 that performs or facilitates zone-based error-correction parity calculation in accordance with some embodiments described herein. In some embodiments, the controller 115 includes at least a portion of the zone-based error-correction parity calculator 122. For example, the controller 115 can include a processor 117 (processing device) configured to execute instructions stored in local memory 119 for performing the operations described herein. In some embodiments, the zone-based error-correction parity calculator 122 is part of the host system 120, such as a software application or an operating system on the host system 120.

According to some embodiments, the memory sub-system 110 can receive, from the host system 120, a request to write data (e.g., host/user data) to a first zone of a set of zones of the memory components 112A to 112N. In response to the request, the zone-based error-correction parity calculator 122 can cause the memory sub-system controller 115 to write the data to a set of blocks that correspond to the first zone of the memory components 112A to 112N. Additionally, in response to the request, the zone-based error-correction parity calculator 122 can cause the memory sub-system controller 115 to determine that previously written data to the first zone satisfies a zone completeness criterion. For instance, the zone-based error-correction parity calculator 122 can cause the memory sub-system controller 115 to retrieve a size threshold associated with the first zone and determine that an amount of data previously written to the first zone satisfies the size threshold. If the amount of data previously written to the first zone satisfies the size threshold, the zone completeness criterion can be determined to be met. The size threshold can correspond to a maximum size of the first zone (e.g., a size of a die that includes blocks for storing data in the first zone) or can correspond to a fraction of the maximum size (e.g., 25%, 50%, or 75% of the size of the die).

As another example, the zone-based error-correction parity calculator 122 can cause the memory sub-system controller 115 to retrieve a time threshold associated with the first zone and determine that an elapsed time since the previously written data was written to the first zone satisfies the time threshold. If the elapsed time since the previously written data was written to the first zone satisfies the time threshold, the zone completeness criterion can be determined to be met. In such cases, the first set of error correction parity data is generated prior to the amount of the previously written data reaching the size threshold.

The zone-based error-correction parity calculator 122 can cause the memory sub-system controller 115 to generate a first set of error correction parity data for the first zone based on a result of the determining that the previously written data to the first zone satisfies the zone completeness criterion. For example, zone-based error-correction parity calculator 122 can cause the memory sub-system controller 115 to copy the previously written data from the first zone to a temporary storage location (e.g., DRAM) and generate tracking data that identifies a set of zones associated with error correction parity data stored in the temporary storage location. In some instances, the first set of error correction parity data includes Redundant Array of Independent Nodes (RAIN) parity data.

Depending on the embodiment, the tracking data can be saved in reserved memory space of the memory sub-system 110, which can be provided by the memory components 112A to 112N or the local memory 119. The tracking data can comprise a data structure that can implement zone identification information that indicate which zones (adjacent or non-adjacent) are associated with particular parity data currently stored in the temporary storage location. The tracking data can also include in the data structure information indicating a last time since the parity data has been updated (e.g., as a result of another zone being determined to meet a corresponding zone completeness criterion).

The zone-based error-correction parity calculator 122 can cause the memory sub-system controller 115 to determine that data stored in a second zone satisfies the zone completeness criterion and in response to determining that the data stored in the second zone satisfies the zone completeness criterion, update the first set of error correction parity data stored in the temporary storage location based on the data stored in the second zone. In some instances, the zone-based error-correction parity calculator 122 can cause the memory sub-system controller 115 to update the first set of error correction parity data by combining the first set of error correction parity data stored in the temporary storage location with the data stored in the second zone. In some examples, the first set of error correction parity data stored in the temporary storage location is combined with the data stored in the second zone by performing an XOR (or other suitable logic operation) of the two sets of data. After updating the first set of error correction parity data, the zone-based error-correction parity calculator 122 can cause the memory sub-system controller 115 to update the tracking data to include the second zone in the set of zones associated with the error correction parity data stored in the temporary storage location. Namely, the tracking data can add a data structure that identifies the storage locations (e.g., the starting block number and the ending block number) of the first zone and the storage locations (starting and ending block numbers) of the second zone.

The zone-based error-correction parity calculator 122 can cause the memory sub-system controller 115 to determine that a quantity of zones in the set of zones satisfies a parity storage criterion. For instances, the parity storage criterion can be a value representing how many zones can be represented by or combined into a particular set of parity data. The value of the parity storage criterion can be determined based on a level of risk, a tolerance of data loss, and/or likelihood of data loss associated with the particular type of memory component 112A-112N. In some examples, if a high level of risk or low level of data loss tolerance (meaning that a certain amount of data loss cannot be tolerated) is specified, the number or quantity of zones corresponding to the parity storage criterion can be set to a first quantity (e.g., a low quantity including three zones). In some examples, if a low level of risk or high level of data loss tolerance is specified, the number or quantity of zones corresponding to the parity storage criterion can be set to a second quantity greater than the first quantity (e.g., a high quantity including ten zones). As the number of zones represented by the parity storage criterion increases, the number of times that parity data is written to the memory component 112A-112N decreases, which increases speed and efficiency of operating the devices but also increases data loss risk. The zone-based error-correction parity calculator 122 can cause the memory sub-system controller 115 to, in response to determining that the quantity of zones satisfies the parity storage criterion, write the error correction parity data stored in the temporary storage location to a specified parity storage location on the memory component 112A-112N.

The zone-based error-correction parity calculator 122 can cause the memory sub-system controller 115 to determine that the error correction parity data stored in the temporary storage location has become invalid. For example, the temporary storage location can become invalid due to a power failure or hardware failure that causes the data in the temporary storage location to become corrupt or deleted. In such cases, the zone-based error-correction parity calculator 122 can cause the memory sub-system controller 115 to access the tracking data in order to identify a second set of zones associated with error correction parity data previously stored in the temporary storage location. The zone-based error-correction parity calculator 122 can cause the memory sub-system controller 115 to regenerate the error correction parity data for storage in the temporary storage location based on data stored in at least one of the first set of zones or the second set of zones. For example, the zone-based error-correction parity calculator 122 can cause the memory sub-system controller 115 to perform an XOR operation between the data stored in all of the zones specified by the tracking data and store the result of the XOR operation in the temporary storage location.

The zone-based error-correction parity calculator 122 can cause the memory sub-system controller 115 to determine that data stored in a second zone satisfies a second zone completeness criterion that can be the same or different from the zone completeness criterion associated with the first zone. Namely, the first zone completeness criterion can correspond to a completely filled zone (e.g., in which all of the blocks of the zone are written to or in which the entire die has been written to) and the second zone completeness criterion corresponds to a partially filled zone (e.g., in which a certain fraction of the blocks of the zone are written to or in which a certain fraction of the entire die has been written to). In response to determining that the data stored in the second zone satisfies the second zone completeness criterion, the zone-based error-correction parity calculator 122 can cause the memory sub-system controller 115 to generate a second set of error correction parity data for the second zone.

In some examples, the zone-based error-correction parity calculator 122 can cause the memory sub-system controller 115 to maintain two sets of error correction parity each associated with a different collection of zones and different types of zone completeness criterion. In such cases, when tracking data associated with the first set of error correction parity indicates that a quantity of zones represented by the first set of error correction parity reaches the parity storage criterion, the zone-based error-correction parity calculator 122 can cause the memory sub-system controller 115 to write the first set of error correction parity to a non-volatile storage location without writing the second set of error correction parity to another non-volatile storage location. At a later time, when tracking data associated with the second set of error correction parity indicates that a quantity of zones (which can be the same or different from the quantity associated with the first set of error correction parity) represented by the second set of error correction parity reaches the same or different parity storage criterion, the zone-based error-correction parity calculator 122 can cause the memory sub-system controller 115 to write the second set of error correction parity to a corresponding non-volatile storage location.

Depending on the embodiment, the zone-based error-correction parity calculator 122 can comprise logic (e.g., a set of transitory or non-transitory machine instructions, such as firmware) or one or more components that causes the memory sub-system 110 (e.g., the memory sub-system controller 115) to perform operations described herein with respect to the zone-based error-correction parity calculator 122. The zone-based error-correction parity calculator 122 can comprise a tangible or non-tangible unit capable of performing operations described herein. Further details with regards to the operations of the zone-based error-correction parity calculator 122 are described below.

Figure 2:
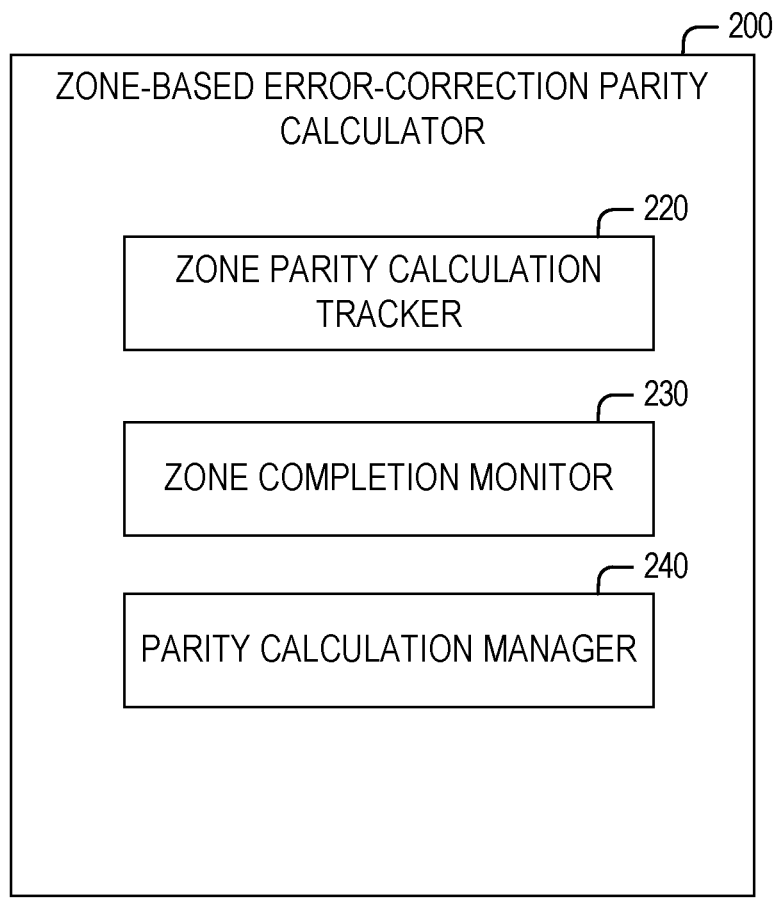
FIG. 2 is a block diagram of an example zone-based error-correction parity calculator, in accordance with some implementations of the present disclosure.

FIG. 2 is a block diagram of an example zone-based error-correction parity calculator 200, in accordance with some implementations of the present disclosure. As illustrated, the zone-based error-correction parity calculator 200 comprises a zone parity calculation tracker 220, a zone completion monitor 230, and a parity calculation manager 240. For some embodiments, the zone-based error-correction parity calculator 200 can differ in components or arrangement (e.g., less or more components) from what is illustrated in FIG. 2.

The zone-based error-correction parity calculator 200 enables or facilitates writing user data to a set of zones including respective blocks of the set of memory components 112 while deferring performance of a set of error-correction parity calculations on the set of blocks until a zone completion criterion is met. The zone parity calculation tracker 220 enables or facilitates updates to tracking data to identify a set of zones associated with parity data that is temporarily stored and an elapsed time since the parity data has been generated. For instance, the zone parity calculation tracker 220 can enable or facilitate generation of block indices that specify zones for which parity data has been generated and stored temporarily in DRAM. The zone completion monitor 230 enables or facilitates determining (e.g., periodically determining or monitoring) whether previously written data in one or more zones satisfies a zone completion criterion. Namely, the zone completion monitor 230 can access a zone completion criterion, such as a specific zone size, and can compare a current amount of data in a particular zone to the specific zone size. When the current amount of data in the particular zone reaches the specific zone size, the zone completion monitor 230 can generate a message or trigger or notification indicating that the zone completeness criterion for the particular zone has been met.

In response to detecting that the zone completeness criterion for the particular zone has been met, the parity calculation manager 240 enables or facilitates management of performance of a set of error-correction parity calculations, such as generation of RAIN parity for the particular zone. Management by the parity calculation manager 240 can include, without limitation: initiating performance of an error-correction parity calculation; clearing out memory of intermediate/partial error-correction parity calculation results generated by an error-correction parity calculation that has been ceased; combining current parity data stored in a temporary storage location with the data in the particular zone, such as by performing an XOR operation; and/or writing a set of results from an error-correction parity calculation (e.g., to a dedicated parity block of a memory component 112) when the error-correction parity calculation has completed performance.

Figure 3:
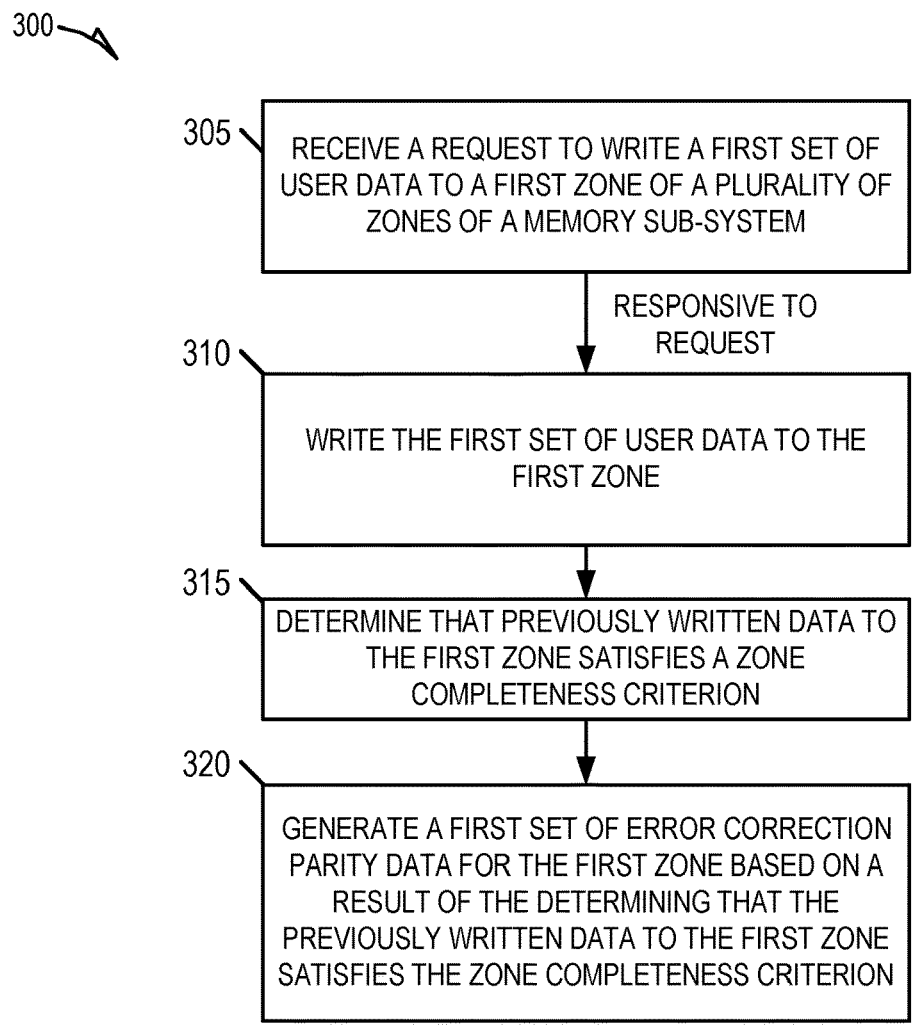
FIGS. 3 and 4 are flow diagrams of example methods to perform zone-based error-correction parity calculations, in accordance with some implementations of the present disclosure.
Figure 4:
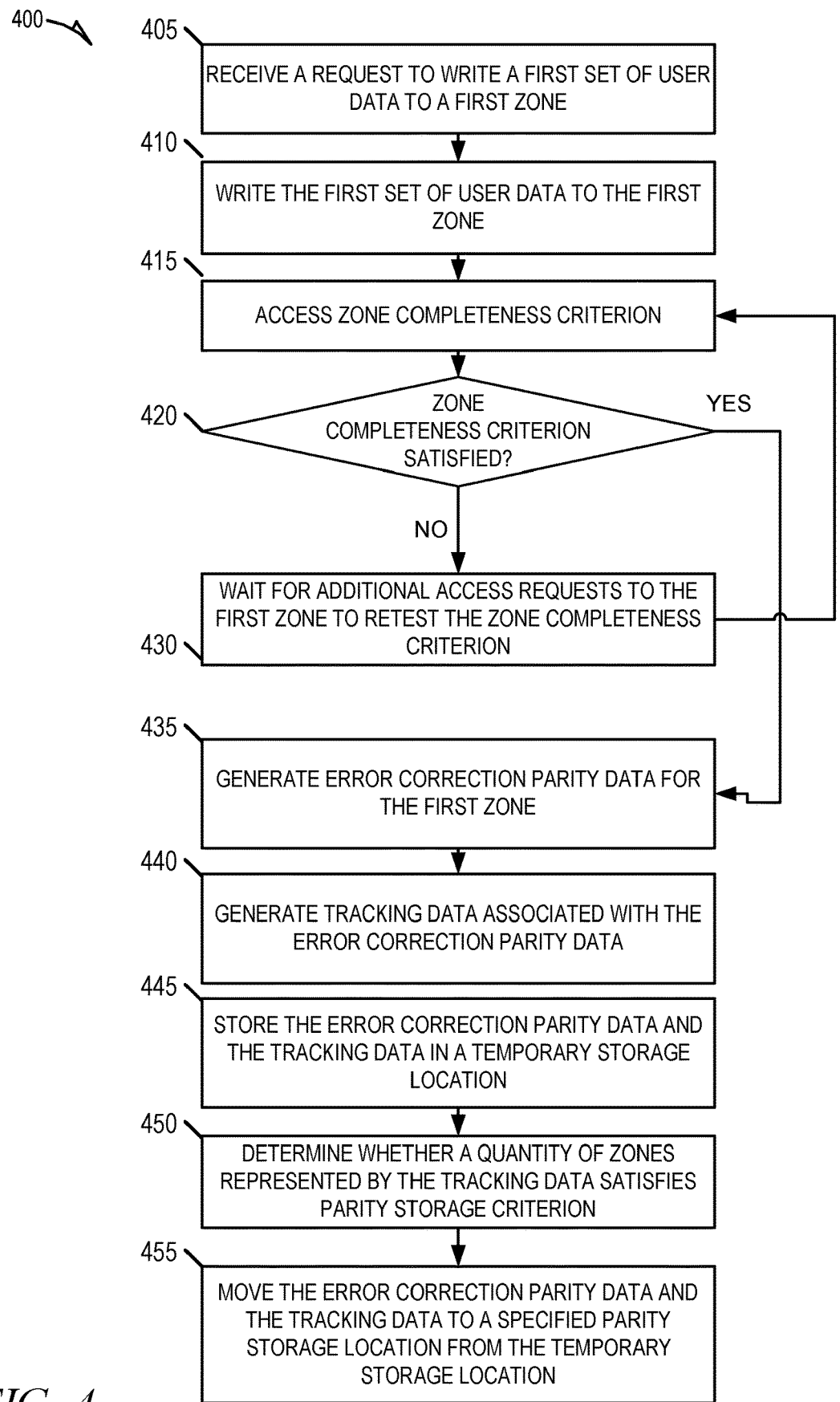

FIGS. 3 and 4 are flow diagrams of example methods 300, 400 to perform zone-based error-correction parity calculations, in accordance with some implementations of the present disclosure. Either of the methods 300, 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the memory sub-system controller 115 of FIG. 1. In these embodiments, the method 300 or the method 400 can be performed, at least in part, by the zone-based error-correction parity calculator 122. Although the processes are shown in a particular sequence or order, unless otherwise specified, the order of the processes can be modified. Thus, the illustrated embodiments should be understood only as examples; the illustrated processes can be performed in a different order, and some processes can be performed in parallel. Additionally, one or more processes can be omitted in various embodiments. Thus, not all processes are required in every embodiment. Other process flows are possible.

Referring now FIG. 3, the method (or process) 300 begins at operation 305, with a processing device of a memory sub-system (e.g., of processor of the memory sub-system controller 115) receiving a request to write a first set of user data to a first zone of a plurality of zones of the memory components (e.g., the memory components 112A to 112N) of the memory sub-system. For some embodiments, the request is from a host system (e.g., the host system 120) communicatively coupled to the memory sub-system.

At operation 310, the processing device of the memory sub-system, in response to receiving the request at operation 305, writes the first set of user data to the first zone while deferring performance of a set of error-correction parity calculations on the first zone until a zone completion criterion is met. For some embodiments, a set of results from performing the set of error-correction parity calculations on the set of blocks facilitates error-correction protection of the set of blocks. For instance, the set of memory components can comprise a set of NAND devices, and the error-protection technique (facilitated by the set of error-correction parity calculations) comprises a RAIN technique as described herein.

Thereafter, at operation 315, the processing device of the memory sub-system determines whether previously written data to the first zone satisfies a zone completion criterion. For instance, the processing device can access a zone size associated with the first zone completion criterion and a size of the amount of data currently stored in the first zone. If the amount of data currently stored in the first zone reaches or transgresses or corresponds to the zone size or threshold size, the zone completion criterion can be determined to be met. In some examples, the processing device can access a time threshold associated with the first zone completion criterion and an elapsed time since data was written to the first zone. If the elapsed time reaches or transgresses or corresponds to the time threshold, the zone completion criterion can be determined to be met.

At operation 320, the processing device of the memory sub-system generates a first set of error correction parity data for the first zone based on a result of the determining whether the previously written data to the first zone satisfies the zone completeness criterion. The processing device of the memory sub-system, performs the set of error-correction parity calculations on the first zone, such as by copying the data from the first zone to a temporary storage location and/or by combining the data from the first zone with data currently stored in the temporary storage location. In some cases, the temporary storage location may not store any data as no parity may have been previously computed or generated. In such instances, the data from the first zone is simply copied to the temporary storage location without performing any other parity computations (e.g., XOR computations). When a second zone is to be included in the temporary storage location, the data currently stored in the temporary storage location (e.g., the first zone data) is XORed with the data from the second zone. Specifically, in some examples, the data in the first zone can be updated after the zone completion criterion is met and the temporary storage location is updated to represent the data in the first zone. In such cases, the temporary storage location can immediately be updated to represent the updated data in the first zone. Namely, once a given zone has reached the zone completion criterion, the corresponding parity data stored in the temporary storage location can continuously be updated as new data is written to the given zone. This ensures that the parity data is maintained as current with respect to data written to a set of zones represented by the parity data.

The processing device can determine that data is written to a second zone (which is adjacent to or non-adjacent to the first zone). The processing device can determine that the zone completion criterion of the second zone is also met. In response, the processing device can combine the data from the second zone with the parity data currently stored in the temporary storage location (e.g., for the first zone) in order to generate parity representing the data from the first zone and the second zone. The processing device can determine that the number of zones represented by the parity data stored in the temporary storage location has reached a threshold or a parity storage criterion. In such cases, the processing device can move the parity data stored in the temporary storage location to a permanent or non-volatile storage location. The memory sub-system can discard any intermediate/partial error-correction parity data generated thus far after the parity data is moved to the permanent storage location, thereby freeing up any memory resources (e.g., on the local memory 119) that was being used by the performance of the set of error-correction parity calculations.

Referring now to FIG. 4, the method (or process) 400 begins at operation 405, with a processing device of a memory sub-system receiving a request to write a first set of user data to a first zone.

At operation 410, the processing device can write the first set of user data to the first zone. Thereafter, at operation 415 the processing device can access the zone completeness criterion for the first zone and at operation 420 can determine if the zone completeness criterion for the first zone has been satisfied (as discussed above). In response to determining that the zone completeness criterion for the first zone has been satisfied, the method proceeds to operation 435. In response to determining that the zone completeness criterion for the first zone has not been satisfied, the method proceeds to operation 430.

At operation 430, the processing device waits for additional access requests to the first zone to retest the zone completeness criterion. For example, if the amount of data written to the first zone does not correspond to a size threshold, the processing device continues monitoring the access patterns of the first zone to determine when the amount of the data written to the first zone reaches the size threshold. At this point, the processing device performs operation 435 to generate the error correction parity data for the first zone. In some cases, the processing device generates the error correction parity data by copying over the data from the first zone to a temporary storage location and/or by combining (performing an XOR operation) the first zone data and data currently stored in the temporary storage location.

Thereafter, the processing device performs operation 440 to generate tracking data associated with the error correction parity data. The tracking data can specify the boundaries or indices of each zone represented by the error correction parity data. The tracking data can be stored, in operation 445, in a permanent storage location or in a temporary storage location together with the error correction parity data. Thereafter, the processing device performs operation 450 to determine whether a quantity of zones represented by the tracking data satisfies a parity storage criterion (e.g., a threshold quantity of zones). In such cases, the processing device performs operation 455 to move the error correction parity and/or the tracking data from the temporary storage location to a specified parity storage location on non-volatile or permanent storage.

Figure 5:
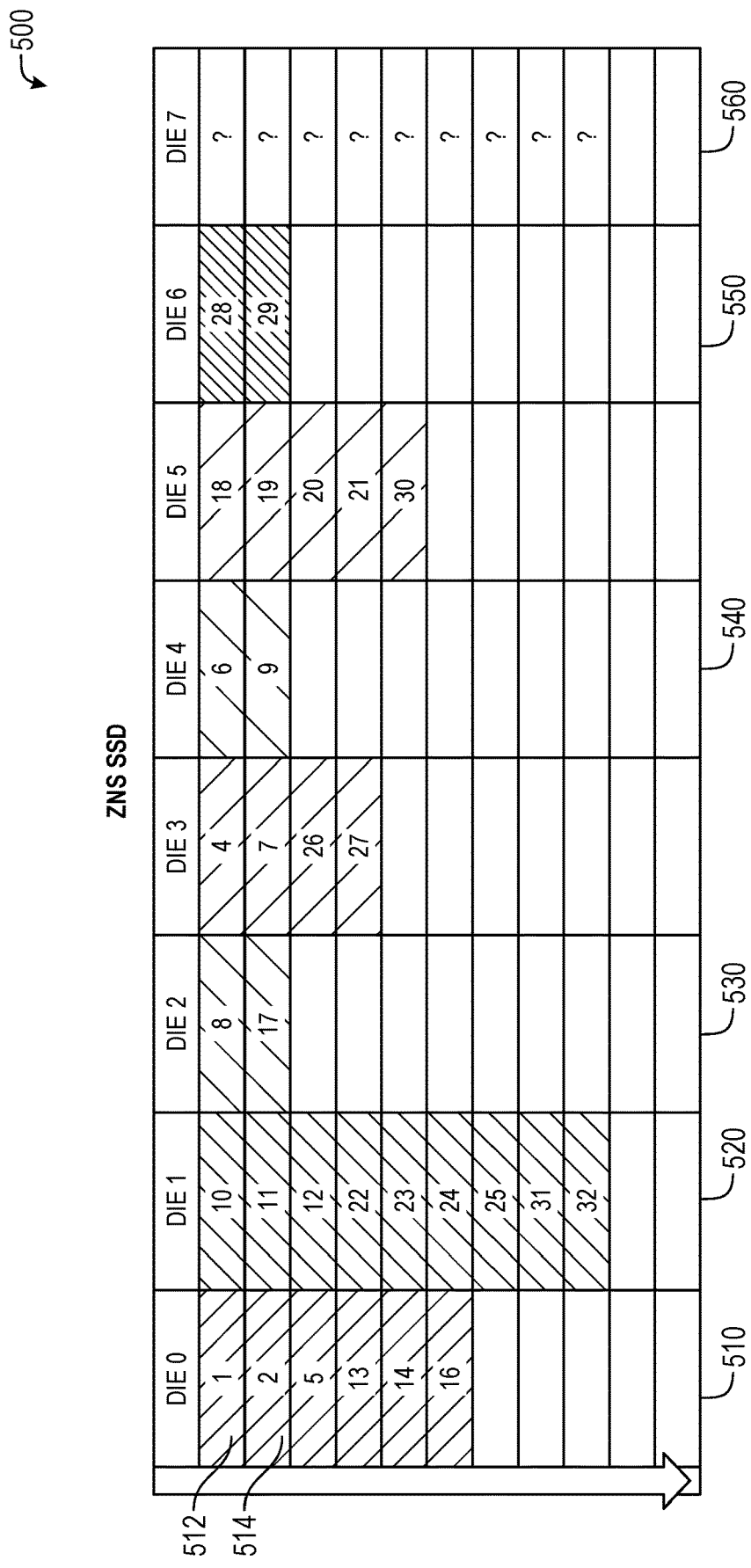
FIG. 5 presents a table illustrating an example set of zones used to store user data and the error-correction parity data, in accordance with some implementations of the present disclosure.

FIG. 5 presents a table 500 that illustrates an example of an error-correction protection technique (more specifically, a RAIN technique) that bases error correction parity generation and storage on dedicated data zones of a set of memory components, in accordance with some embodiments. As shown by the table 500, the example RAIN technique is implemented by seven NAND die (Die 0 through 7), where each die has a set of blocks or planes. For some embodiments, the die are implemented using SLC NAND devices with multiplane support. The data chunk size for each memory page 0 through 6 on each plane can comprise 16 KB. The different shading patterns shown in the drawing represent different zones associated with different applications.

In some cases, a first zone 510 can correspond to a first size (e.g., a maximum size of Die 0) and includes a first data block 512 and a second data block 514. A second zone 520 can correspond to a second size and can be configured to store data on all of the blocks of Die 1; a third zone 530 can be configured to store data on all of the blocks of Die 2; a fourth zone 540 can be configured to store data on all of the blocks of Die 4 or on some specified fraction of Die 4; a fifth zone 550 can be configured to store data on all of the blocks of Die 6 or on some specified fraction of Die 6; and a parity storage location 560 can be configured to permanently store data on Die 7.

In some examples, user data can be written to the first zone 510. The processing device can determine that the user data written to the first zone 510 fails to satisfy the zone completeness criterion. This may be the case because the first zone 510 is configured to store data on all blocks of Die 0 and the amount of data written to the first zone 510 has not completely filled all of the blocks of Die 0. At the same or a later time, user data can be written to the second zone 520.

The processing device can determine that the user data written to the second zone 520 satisfies the zone completeness criterion. This may be the case because the second zone 520 is configured to store data on all blocks of Die 1 and the amount of data written to the second zone 520 has completely filled all of the blocks of Die 1. In such cases, the processing device can copy the data from the second zone 520 to a temporary storage location. At a later time, user data can be written to the fifth zone 550. The processing device can determine that the user data written to the fifth zone 550 satisfies the zone completeness criterion. In such cases, the processing device can combine the data written to the fifth zone 550 with the data from the second zone 520 previously written to a temporary storage location. The processing device can update the tracking data to specify that the second zone 520 and the fifth zone 550 are represented by the parity data stored in the temporary storage location. The processing device can compute how many zones are currently represented by the tracking data. In response to determining that the quantity of zones represented by the tracking data transgresses or corresponds to a parity storage criterion (or if the elapsed time since the parity data was last stored in the temporary storage location transgresses a time threshold), the processing device moves the parity data from the temporary storage location to the parity storage location 560.

In some examples, user data can be written to the third zone 530. The processing device can determine that the user data written to the third zone 530 satisfies the zone completeness criterion. This may be the case because the third zone 530 is configured to store data on all blocks of Die 2 and the amount of data written to the second zone 520 has filled more than a specified fraction (e.g., 25%, 50% or 75%) of all of the blocks of Die 2. In such cases, the processing device can copy the data from the third zone 530 to a temporary storage location. At a later time, user data can be written to the fourth zone 540. The processing device can determine that the user data written to the fourth zone 540 satisfies the zone completeness criterion (e.g., because the amount of data written to the fourth zone 540 has filled more than a specified fraction (e.g., 25%, 50% or 75%) of all of the blocks of Die 4). In such cases, the processing device can combine the data written to the fourth zone 540 with the data from the third zone 530 previously written to a temporary storage location. The processing device can update the tracking data to specify that the third zone 530 and the fourth zone 540 are represented by the parity data stored in the temporary storage location. The processing device can compute how many zones are currently represented by the tracking data. In response to determining that the quantity of zones represented by the tracking data transgresses or corresponds to a parity storage criterion (or if the elapsed time since the parity data was last stored in the temporary storage location transgresses a time threshold), the processing device moves the parity data from the temporary storage location to the parity storage location 560.

Figure 6A:
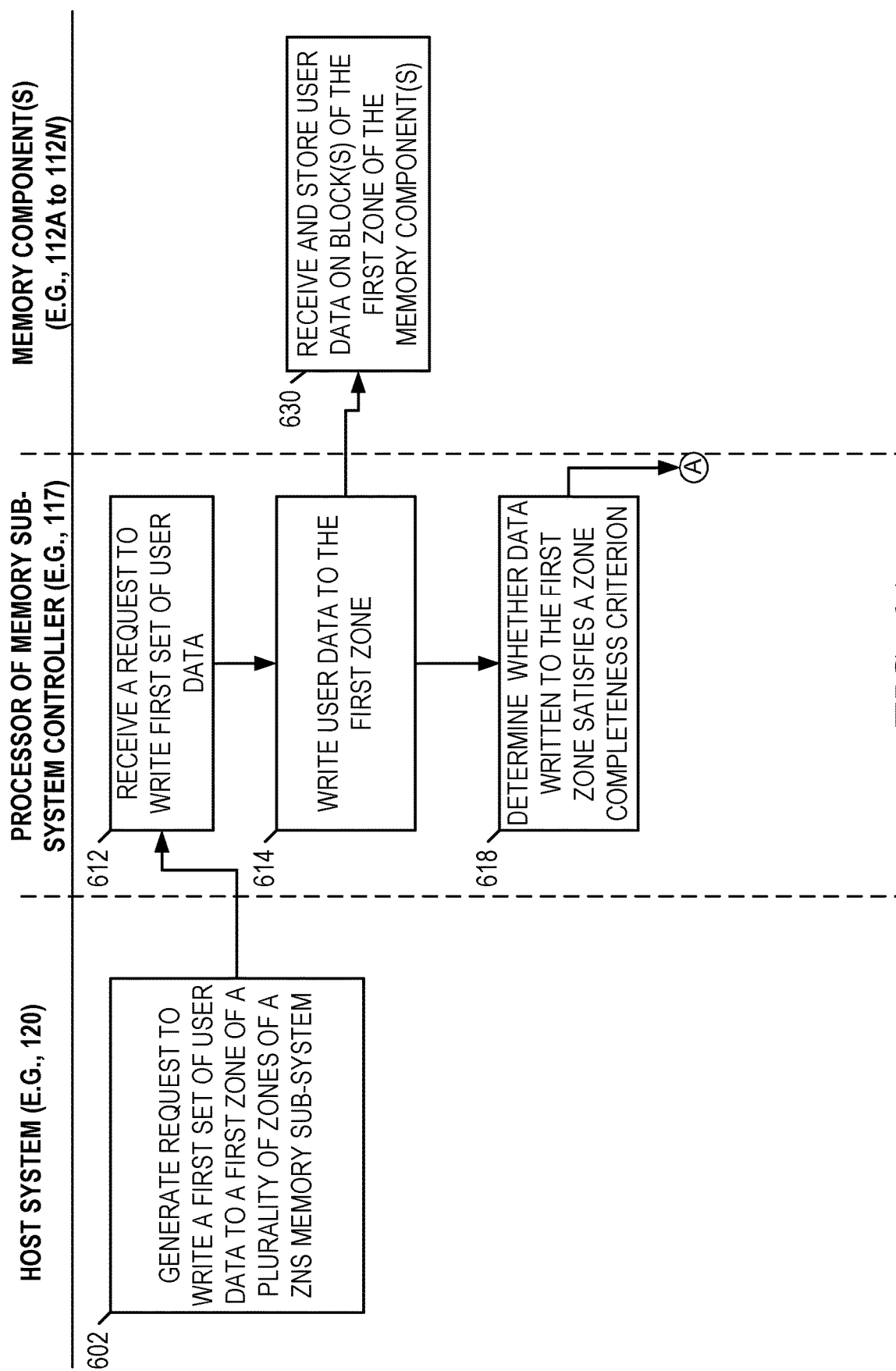
FIGS. 6A and 6B provide an interaction diagram illustrating interactions between components of the computing environment in the context of some embodiments in which a method performs zone-based error-correction parity calculation.
Figure 6B:
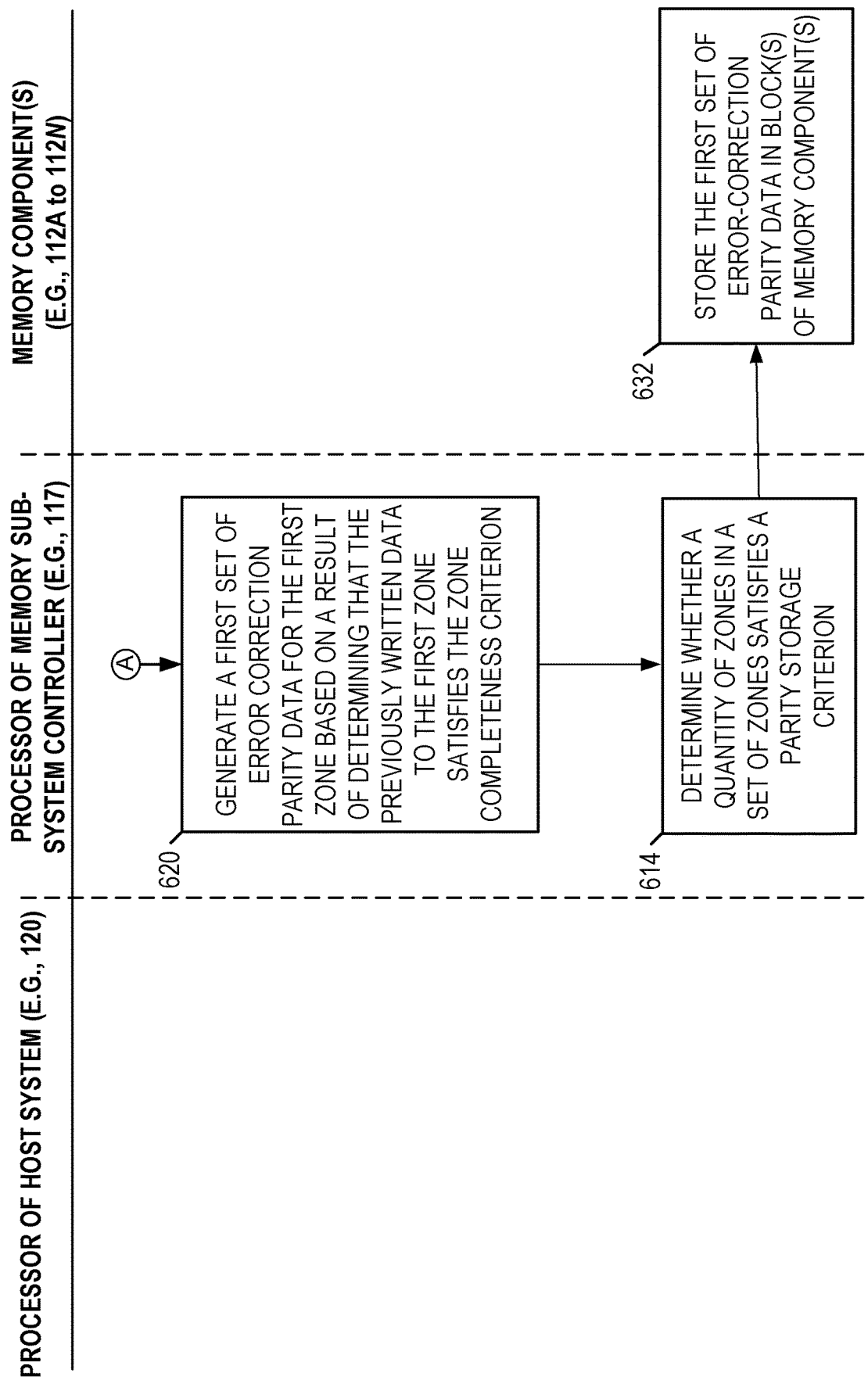

FIGS. 6A and 6B provide an interaction diagram illustrating interactions between components of the computing environment 100 in the context of some embodiments in which a method (or process) to perform zone-based error-correction parity calculation. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by the memory sub-system controller 115. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In the context of the example illustrated in FIGS. 6A and 6B, the host system can comprise the host system 120, the processor of the memory sub-system controller can comprise the processor 117 of the memory sub-system 110, and the one or more memory components can comprise at least one of the memory components 112A to 112N.

As shown in FIG. 6A, at operation 602, the host system (e.g., via a processor of the host system 120) generates a request to write a first set of user data to a first zone of a plurality of zones of the memory sub-system and, at operation 612, the processor of the memory sub-system controller receives the request from the host system.

At operation 614, the processor of the memory sub-system controller writes user data to a set of blocks (e.g., open blocks) of the first zone of a set of memory components (e.g., the memory components 112A to 112N) while deferring performance of one or more error-correction parity calculations on the blocks to which the user data is being written. At operation 630, the set of memory components of the first zone receive and store the first set of user data.

At operation 618, the processor of the memory sub-system controller determines that data written to the first zone satisfies a zone completeness criterion.

Referring now to FIG. 6B, at operation 620 the processor of the memory sub-system controller generates a first set of error correction parity data for the first zone based on a result of determining that the previously written data to the first zone satisfies the zone completeness criterion. The first set of error correction parity data is stored in a temporary storage location and is associated with tracking data specifying the zones represented by the temporary storage location parity data. At operation 614, the processor of the memory sub-system controller determines that a quantity of zones in a set of zones satisfies a parity storage criterion (e.g., a quantity of zones corresponds to a quantity of zones threshold or an elapsed time since the temporary storage location has been updated transgresses a time threshold). In such cases, at operation 632 the processor of the memory sub-system controller writes or stores the first set of error correction parity data to the set of memory components (e.g., by moving the parity data from the temporary storage location to the set of memory components).

Figure 7:
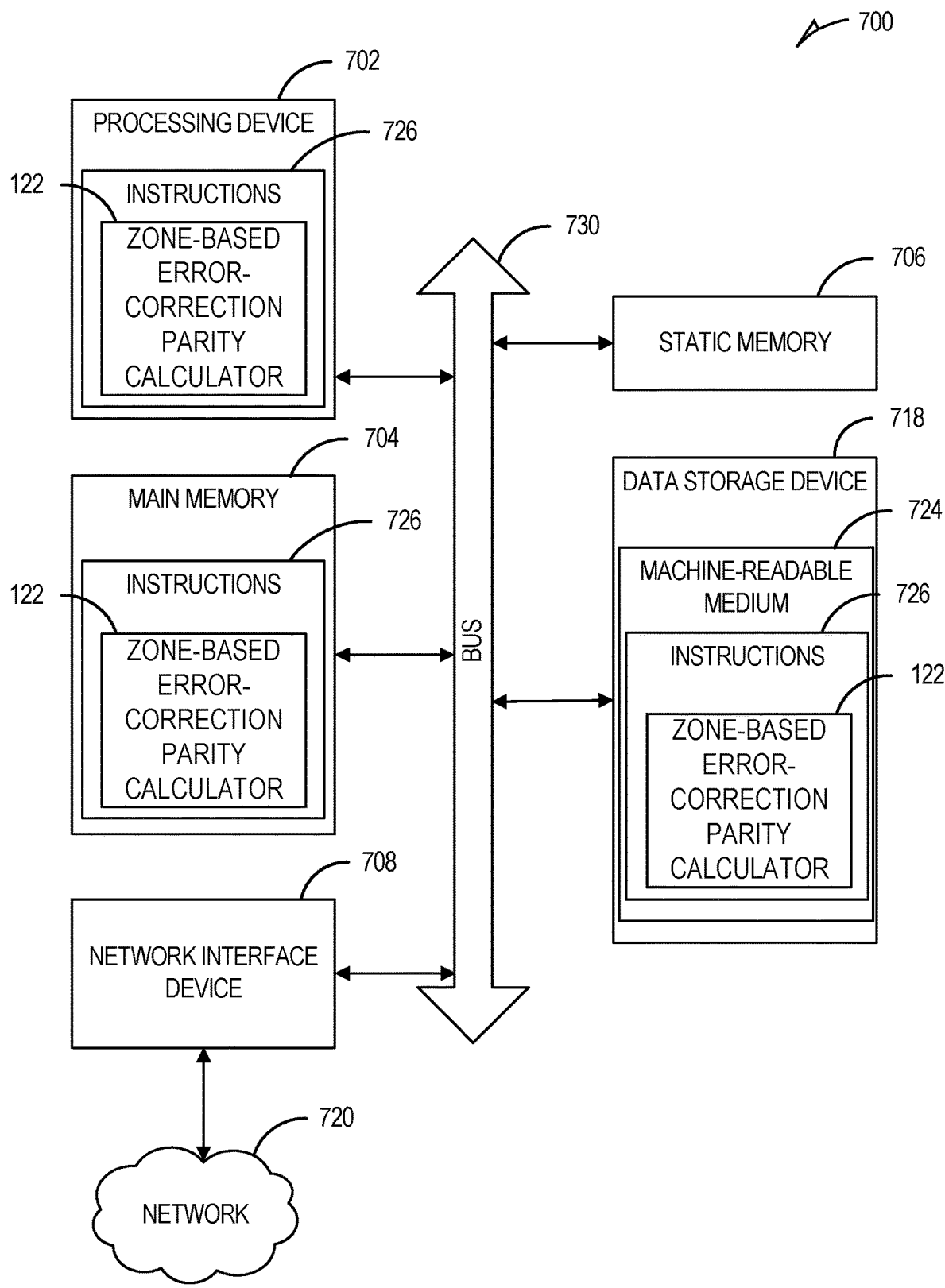
FIG. 7 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the zone-based error-correction parity calculator 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a zone-based error-correction parity calculator (e.g., the zone-based error-correction parity calculator 122 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the embodiments of the disclosure as set forth in the following claims. The specification and drawings are, accordingly, to be regarded in an illustrative sense rather than a restrictive sense.

What is claimed is:

1. A system comprising:
a set of memory components; and
a processing device, operatively coupled to the set of memory components, configured to perform operations comprising:
receiving a request to write a set of user data to a zone of a plurality of zones of a memory sub-system; and
in response to the request:
writing the set of user data to the zone;
deferring performance of a set of error-correction parity calculations on the set of user data written to one or more of the set of memory components comprising the zone until a zone completeness criterion is satisfied;
after writing the set of user data to the one or more of the set of memory components comprising the zone, determining whether previously written data to the zone satisfies the zone completeness criterion; and
in response to determining that the previously written data to the one or more of the set of memory components comprising the zone satisfies the zone completeness criterion, generating a set of error correction parity data by performing the set of error-correction parity calculations for the zone using the set of user data written to the one or more of the set of memory components.

2. The system of claim 1, wherein the determining of whether the previously written data to the zone satisfies the zone completeness criterion comprise:
determining whether an amount of the previously written data written to the zone satisfies a size threshold; and
in response to determining that the amount satisfies the size threshold, determining whether the previously written data to the zone satisfies the zone completeness criterion.

3. The system of claim 2, wherein the size threshold corresponds to a maximum size of the zone.

4. The system of claim 2, wherein the size threshold corresponds to a specified fraction of a maximum size of the zone.

5. The system of claim 2, wherein the determining of whether the previously written data to the zone satisfies the zone completeness criterion comprise:
determining whether an elapsed time since the previously written data was written to the zone satisfies a time threshold; and
in response to determining that the elapsed time satisfies the time threshold, determining whether the previously written data to the zone satisfies the zone completeness criterion, wherein the set of error correction parity data is generated prior to the amount of the previously written data reaching the size threshold.

6. The system of claim 1, wherein the operations for generating of the set of error correction parity data comprise:
copying the previously written data from the zone to a temporary storage location; and
generating tracking data that identifies a set of zones associated with error correction parity data stored in the temporary storage location.

7. The system of claim 6, wherein the zone is a first zone, the operations comprising:
determining whether data stored in a second zone satisfies the zone completeness criterion; and
in response to determining that the data stored in the second zone satisfies the zone completeness criterion, updating the set of error correction parity data stored in the temporary storage location based on the data stored in the second zone.

8. The system of claim 7, wherein the operations for updating of the set of error correction parity data comprise:
combining the set of error correction parity data stored in the temporary storage location with the data stored in the second zone.

9. The system of claim 7, the operations comprising:
updating the tracking data to include the second zone in the set of zones associated with the error correction parity data stored in the temporary storage location.

10. The system of claim 9, the operations comprising:
determining whether a quantity of zones in the set of zones satisfies a parity storage criterion; and
in response to determining that the quantity of zones satisfies the parity storage criterion, writing the error correction parity data stored in the temporary storage location to a specified parity storage location on the memory sub-system.

11. The system of claim 9, wherein the set of zones is a first set of zones, the operations comprising:
determining whether the error correction parity data stored in the temporary storage location has become invalid; and
in response to determining that the error correction parity data stored in the temporary storage location has become invalid:
accessing the tracking data;
identifying a second set of zones associated with error correction parity data previously stored in the temporary storage location based on the tracking data; and
regenerating the error correction parity data for storage in the temporary storage location based on data stored in at least one of the first set of zones or the second set of zones.

12. The system of claim 6, wherein the temporary storage location comprises a data storage location on a dynamic random access memory (DRAM) device.

13. The system of claim 1, wherein the set of error correction parity data comprises Redundant Array of Independent Nodes (RAIN) parity data.

14. The system of claim 1, wherein the zone completeness criterion comprises a first zone completeness criterion, the zone being a first zone, wherein the set of error correction parity data is a first set of error correction parity data, the operations comprising:
determining whether data stored in a second zone satisfies a second zone completeness criterion; and
in response to determining that the data stored in the second zone satisfies the second zone completeness criterion, generating a second set of error correction parity data for the second zone.

15. The system of claim 14, wherein the zone completeness criterion corresponds to a completely filled zone and the second zone completeness criterion corresponds to a partially filled zone.

16. The system of claim 1, the operations comprising:
determining that an elapsed time since the previously written data was written to the zone satisfies a time threshold; and
generating the set of error correction parity data in response to determining that the elapsed time since the previously written data was written to the zone satisfies the time threshold.

17. A method comprising:
receiving a request to write a set of user data to a zone of a plurality of zones of a memory sub-system; and
in response to the request:
writing the set of user data to the zone;
deferring performance of a set of error-correction parity calculations on the set of user data written to one or more of a set of memory components comprising the zone until a zone completeness criterion is satisfied;
after writing the set of user data to the one or more of the set of memory components comprising the zone, determining whether previously written data to the zone satisfies the zone completeness criterion; and
in response to determining that the previously written data to the one or more memory components comprising the zone satisfies the zone completeness criterion, generating a set of error correction parity data by performing the set of error-correction parity calculations for the zone using the set of user data written to the one or more of the set of memory components.

18. The method of claim 17, the set of error-correction parity calculations comprising:
retrieving the set of user data from an individual memory component of the memory sub-system, the individual memory component comprising a memory die; and
combining the set of user data retrieved from the individual memory component with other user data stored in a temporary storage location.

19. The method of claim 18, wherein combining the set of user data retrieved from the individual memory component with other user data stored in the temporary storage location comprises performing a logical XOR operation on the set of user data retrieved from the individual memory component and other user data stored in the temporary storage location.

20. A non-transitory computer-readable storage medium comprising instructions that, when executed by a processing device, cause the processing device to perform operations comprising:
receiving a request to write a set of user data to a zone of a plurality of zones of a memory sub-system; and
in response to the request:
writing the set of user data to the zone;
deferring performance of a set of error-correction parity calculations on the set of user data written to one or more of a set of memory components comprising the zone until a zone completeness criterion is satisfied;
after writing the set of user data to the one or more of the set of memory components comprising the zone, determining whether previously written data to the zone satisfies the zone completeness criterion; and
in response to determining that the previously written data to the one or more memory components comprising the zone satisfies the zone completeness criterion, generating a set of error correction parity data by performing the set of error-correction parity calculations for the zone using the set of user data written to the one or more of the set of memory components.

\* \* \* \* \*